Feb. 6, 1968  L. E. SORENSEN ETAL  3,367,242
CONTROL DEVICES FOR HYDRAULIC SYSTEMS
Filed Nov. 23, 1965  2 Sheets-Sheet 1

INVENTORS:
Leif E. Sørensen
and Svend Djernaes,
BY
THEIR ATTORNEY

United States Patent Office 3,367,242
Patented Feb. 6, 1968

3,367,242
CONTROL DEVICES FOR HYDRAULIC SYSTEMS
Leif Erik Sorensen, 131 Ryes-gade, Copenhagen, Denmark, and Svend Djernas, Nykobing Falster, Denmark; said Djernaes assignor to said Sorensen
Filed Nov. 23, 1965, Ser. No. 509,308
11 Claims. (Cl. 91—413)

ABSTRACT OF THE DISCLOSURE

A control unit for simultaneous multiple parts operation in different directions has a single control lever movable in these directions, a continuously variable control device for each direction that controls a hydraulic driving device provided for each of the different directions.

---

Figure 1:
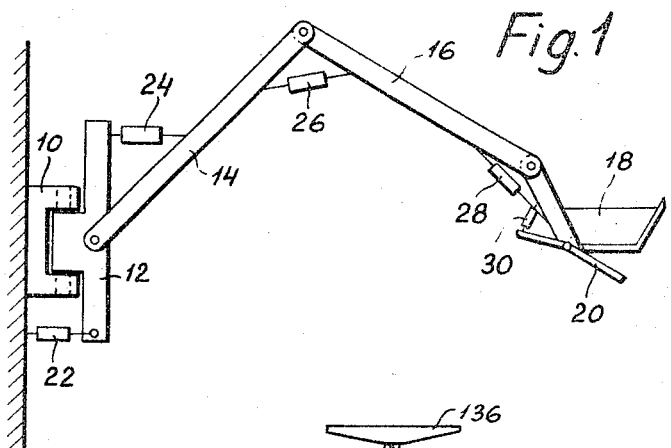

This invention relates to a control unit for hydraulic systems comprising a number of hydraulically operated or controlled members, for example for excavators or jib cranes.

Hitherto known control units for such systems have been provided with a control lever for each hydraulic device of the system so that the operator has to use both hands for controlling the system and at the most is able to produce two movements at a time.

An object of the invention is to provide a control unit making it possible essentially to simplify the operation of such systems.

Another object of the invention is to provide a control unit comprising a single control lever by the operating of which it is possible independently of each other to control three or four hydraulic devices at a time.

A further object of the invention is to provide a control unit comprising a single control lever simultaneously movable in at least three different directions and connected to at least three control devices, for example hydraulic valves or adjustable potentiometers, one for each of the said directions of motion, in such a manner that each control device is operated by a movement of the control lever in the corresponding direction only, and retroactive devices adapted to be set by the hydraulic driving devices for the movable members of the system and connected to the control devices in such a manner that each position of a control device corresponds to a certain position of the corresponding driving device.

Since a main member of an hydraulic system of the kind concerned, for example a bucket or a grab, normally has to be moved in three different directions, namely forward and backward, from side to side, and up and down, and these movements are produced by means of a hydraulic driving device for each direction, which device normally moves a corresponding mechanical member of the system. By the use of a control unit as the one last stated each position of the control lever corresponds to a certain position of the main member, since although said position of the control lever may be reached by directly moving the lever to said position, theoretically the movement of the lever may be considered as obtained by successive movements in each of the directions of motion of the control lever.

A still further object of the invention is to provide a control unit comprising a single control lever simultaneously movable in four different directions, for example forward and backward, from side to side, up and down, as well as rotated and for each such direction of motion being connected to a corresponding control device.

In practice often just four possibilities of movement of the main member of the hydraulic system are wanted as for example a grab member must be opened and closed and a bucket may have an adjustable inclination or may be provided with an opening part. However, still another object of the invention is to provide a control unit of the kind concerned provided with a control lever by means of which three or four control devices may be set simultaneously but independently of each other, and which comprises an auxiliary setting device operable by the same hand as said control lever, for example an auxiliary rod mounted on or in the control lever slidable in the longitudinal direction thereof, and connected to a control device for an hydraulic driven operating device of the hydraulic system. Such an auxiliary setting device is suitable for example for producing opening or closing of a grab.

In known hydraulic systems of the kind concerned each control lever is normally directly connected to the control valve, most often a slide valve, for the corresponding hydraulic driving device. This is possible also when a control unit according to the present invention is used; hydraulic control valves provided with control members cooperating with retroactive members of the hydraulic systems are well known, but are relatively complicated, particularly where there is a great distance between the control valve and the hydraulic driving device controlled thereby.

Therefore, in the new control unit it may be convenient that at least one of the hydraulic driving devices of the system is controlled by electromagnetic valves or corresponding electrically controlled valves, that the corresponding control device connected to the control lever is an adjustable control potentiometer, the ends of the coil of which are connected to one end each of the coil of an adjustable answering potentiometer, the sliding contact of which latter is operatively connected to the movable member of the system, and that the two potentiometer sliding contacts are electrically connected to one pole each of a voltage source while the two coils of a differential relay serving for actuating the valves are inserted, preferably amplifiers, in one each of the two leads between the ends of the two potentiometer coils. Owing thereto, the differential relay is activated only when the two potentiometers, the control potentiometer and the answering potentiometer, have different adjustments but will cease to be activated when the answering potentiometer is brought to a position corresponding to the position set of the control potentiometer.

Other aspects, objects and the several advantages of this invention will be apparent from a study of this disclosure, the accompanying drawings and the appended claims.

Figure 2:
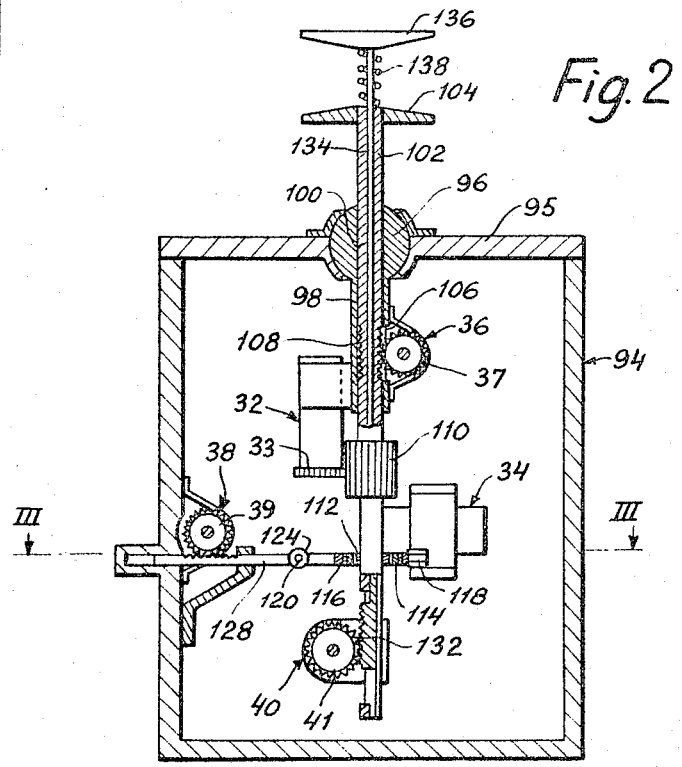
Figure 3:
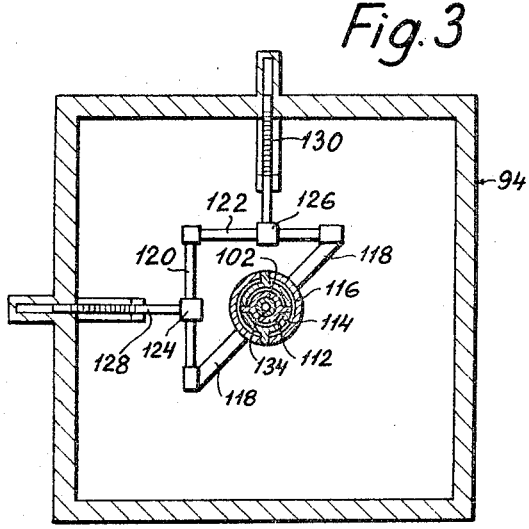
Figure 4:
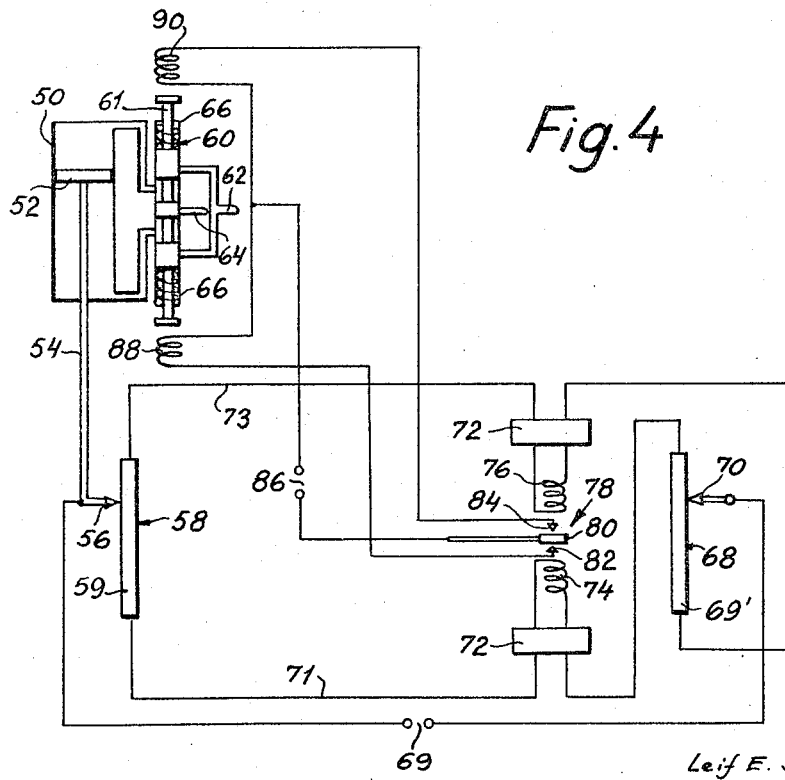

In the drawing:

FIG. 1 is a digrammatic view illustrating the movable members of a hydraulic driven excavator, FIG. 2 is a vertical sectional view of a control unit for controlling the excavator illustrated in FIG. 1, FIG. 3 is a horizontal sectional view taken on the line III—III in FIG. 2, and FIG. 4 is a diagrammatic view illustrating an electromagnetic circuit for the control of an hydraulic piston device.

The excavator shown in FIG. 1 comprises a bearing 10 for an horizontally pivotable supporting bracket 12, in which a main beam 14 is mounted pivotable in vertical direction. At the outer end of the main beam 14 a jib boom is mounted also pivotable in vertical direction and at its outer end a bucket 18 is mounted likewise pivotable in vertical direction. The bucket 18 is provided with a pivotably mounted bottom 20.

The members 12 to 20 are moved by means of hydraulic driving devices 22, 24, 26, 28 and 30 respectively.

Each said driving device is controlled by a control device 32, 34, 36, 38 and 40 respectively, FIGS. 2 and 3 each comprising a movable and a stationary part. Each control device furthermore, for example in the manner described below, cooperating with a retroactive device connected to the corresponding hydraulic driving device in such a manner that each position of the movable part of the control device relative to the stationary part thereof corresponds to a certain position of the corresponding hydraulic driving device and thereby to a certain relative position of the two members of the excavator, between which the driving device is inserted.

In the embodiment shown, as diagrammatically shown in FIG. 4, the control devices and the retroactive devices are electrical potentiometers.

Each hydraulic driving device comprises, as shown in FIG. 4, a hydraulic cylinder 50 having a piston 52 provided with a piston rod 54 which is connected to the member, not shown, driven by the hydraulic driving device as well as to the adjustable sliding contact 56 of an answering potentiometer further comprising a potentiometer coil 59 and constituting said retroactive device.

The inlet and outlet of hydraulic pressure fluid to and from the two ends of the cylinder 50 is controlled by a slide valve device 60 communicating with a pressure fluid inlet 62 and a pressure fluid outlet 64. The slide valve 61 of the valve device 60 is controlled in such a manner by means of springs 66 that, when not positively actuated, it completely cuts off the connection between the cylinder 50 and the inlet 62 as well as the outlet 64.

The valve device 60 is controlled by means of the answering potentiometer 58 in cooperation with a control potentiometer 68 comprising a first part and a second part adjustable relative thereto. In the embodiment shown said first part is a potentiometer coil 69, and the adjustable part is sliding contact 70. The two sliding contacts 56 and 70 are connected to one pole each of a voltage source 69. The two potentiometers 58 and 68 are so arranged that for example an upward displacement of the adjustable sliding contact 70 results in an upward displacement of the piston 52 and thereby of the sliding contact 56 of the answering potentiometer 58. For this purpose the upper end, FIG. 4, of the potentiometer coil 69' is connected by a lead 71 to the lower end of the potentiometer coil 59, and the upper end of the latter is by a lead 73 connected to the lower end of the control potentiometer coil 69'. In each lead 71 and 73 there is, preferably through an amplifier 72 inserted the one coil, 74 and 76 respectively, of a differential relay 78 comprising an armature 80 and contact members 82 and 84. The armature 80 is electrically connected to the one pole of an electric power source 86 the other pole of which is through an electromagnet 88 connected to the contact member 82 and through an electromagnet 90 connected to the contact member 84. The electromagnets 88 and 90 serve for displacement of the slide valve 61 of the valve device 60 since when the electromagnet 88 is energized the slide valve 61 is displaced to its lower position at which it provides communication between the pressure fluid inlet 62 and the lower end of the cylinder 50, whereas when the electromagnet 90 is energized the slide valve 61 is displaced to its upper position at which it provides communication between the pressure fluid inlet 62 and the upper end of the cylinder 50. When neither of the electromagnets 88 and 90 is energized the slide valve 61 is returned to and maintained in neutral position by the springs 66.

In the positions shown of the parts the piston 52 is positioned in the upper half of the cylinder 50, and the two sliding contacts 56 and 70 are correspondingly positioned opposite places on the upper halves of the potentiometer coils 59 and 69' respectively. At this position of the sliding contacts 56 and 70 the electric resistances of the two circuits interconnecting the contacts 56 and 70 and including the leads 71 and 73 respectively are equal and, consequently, the differential relay 78 is in its neutral position so that the two electromagnets 88 and 90 are both unenergized. If now the member connected to the piston 52 is to be moved to a new position in a direction corresponding to a downward displacement of the piston 52, the control sliding contact 70 is set in a corresponding position by downward displacement. Hereby the resistance of the circuit between the contacts 56 and 70 including the lead 71 is increased, whereas the resistance of the circuit between the two contacts including the lead 73 is reduced so that the coil 76 is energized with greater power than the coil 94 and, consequently, the armature 80 will make contact with the contact member 84. Hereby the electromagnet 90 is energized so that the slide 92 is displaced to its upper position and pressure fluid is led to the space within the cylinder 50 above the piston 52 simultaneously with the space below the piston 52 being brought to communicate with the fluid outlet 64. Therefore, the piston 52 is displaced downwards thereby moving the member connected thereto correspondingly and taking along the sliding contact 56 of the answering potentiometer 58 in its movement. When hereby the sliding contact 56 is displaced to a position corresponding to the position, at which the sliding contact 70 is set, the electric resistances of the two circuits including the leads 71 and 73 respectively will again be equal and, consequently, the differential relay 78 returns to its neutral position whereby also the slide valve 61 is displaced to its neutral position at which the amounts of pressure fluid contained in two spaces of the cylinder 50 above and below the piston 52 respectively are shut off so that the piston 52 is immovably maintained in the position thus obtained.

In the control unit shown in FIGS. 2 and 3 the control devices 32 to 40 are control potentiometers corresponding to the control potentiometer 68 shown in FIG. 4, but formed as rotating potentiometers. The control unit comprises a box 94 provided with a cover 95 in which a guide ball 96 is rotatably mounted. The ball 96 is on its lower side provided with a downward extending bushing 98 through which and the ball 96 a through bore 100 is provided. In the bore 100 there is displaceably and rotatably mounted a hollow control lever 102 provided with a handle 104 at its upper end. The first part of the control potentiometer 36 is attached to the bushing 98 and its adjustable part is provided with a gear 37 meshing through a side opening 106 in the bushing 98 with a toothed part 108 of the central lever, which toothed part 108 is provided with circumferential teeth. Thus the potentiometer 36 may be set by a displacement upward or downward of the control lever 102.

Below the bushing 98 a gear 110 is attached to the control lever 102 which gear has an axial length corresponding to the length of the toothed part 108 and meshes with a gear 33 that is connected to the adjustable part of the potentiometer 32, the first part of which is also connected to the bushing 98. Thus the control potentiometer 32 may be set by a rotation of the control lever 102 independent of the vertical setting thereof.

Below the gear 110 the control lever 102 is displaceably and rotatably led through a ring 112 which by means of an intermediate ring 114 is cardanic suspended in a collar 116 supporting, as appears from FIG. 3, by means of two arms 118 two shafts 120 and 122 arranged at right angles to each other. Each shaft 120 and 122 extends through a sleeve 124 and 126 respectively attached to the one end of a rack 128 and 130 respectively mounted in the box 92 displaceable at a right angle to the corresponding shaft 120 or 122. Thus said racks 128 and 130 support the shafts 120 and 122 and thereby the collar 116 with appertaining universal joint 112, 114. The rack 128 meshes with a gear 39 attached to the adjustable part of the control potentiometer 38 the first part of which is stationarily arranged within the box 94. In the same manner the rack 130 serves to set the control potentiometer 34, FIG. 2, the first part of which is also stationarily arranged within the box 94.

If the control lever 102 is pivoted in a plane perpendicular to FIG. 2, independent of the vertical as well as of the rotary setting of the control lever 102, the collar 116 is displaced parallel to the shaft 120 whereby the rack 130 is displaced and sets the potentiometer 34 whereas the rack 128 and thereby the potentiometer 38 remain uninfluenced. On the contrary, if the control lever 102 is pivoted in the plane of FIG. 2, the rack 128 and thereby the potentiometer 38 are acted upon whereas the rack 130 will remain uninfluenced. If the control lever 102 is pivoted in any other plane than the two mentioned above both the potentiometers 34 and 38 will be set.

The potentiometer 40 is attached to the lower end of the control lever 102 and is provided with a gear 41 meshing with a rack 132 provided at the lower end of an auxiliary rod 134 displaceably mounted within the hollow control lever 102 and provided with a handle 136 at its upper end extending upwards from the handle 104. Surrounding the rod 134 a pressure spring 138 is inserted between the two handles 104 and 136.

By means of this control unit all desired movements of for example the excavator shown in FIG. 1 may be obtained by moving only the combined handles 104, 136. If the bucket 18 is to be brought into a certain position, the radial position of the bucket relative to the bearing 10 is adjusted by a rotation of the handle 104, the inclination of the main beam 14 is adjusted by a displacement of the handle 104 forward or backward, the angle between the jib boom 16 and the main beam 14 is adjusted by an axial displacement of the control lever 102 upward or downward, and the angular position of the bucket 18 relative to the jib boom 16 is adjusted by a pivoting of the control lever 104 from side to side, and, if wanted, all above said adjustments may be carried through simultaneously by a direct movement of the control lever directly from its starting position to its final position corresponding to the position desired of the bucket 18. When the bucket 18 is to be emptied and for this purpose is adjusted in a position for example over a truck platform, the hand grasping the two handles 104 and 136 is clenched so that the auxiliary rod 134 is displaced downwardly whereby the bottom 20 will be pivoted away from the bucket 18 and the contents of the bucket 18 thus liberated.

It will be understood that this invention is susceptible to modification in order to adapt it to different usages and conditions. Thus, for example, one or more of the control potentiometers 36 may be replaced by control valves for direct control of the inlet and outlet of pressure fluid to and from the corresponding hydraulic driving devices, provided simultaneously the valves are, as per se known, operatively controlled by the hydraulic driving devices in an answering manner so that each position of the valve member controlled by the control lever corresponds to a certain position of the corresponding hydraulic driving device.

Accordingly, it is desired to comprehend such modifications within the invention as may fall within the scope of the appended claims.

We claim:

1. A control unit for a hydraulic system provided with at least three hydraulically operated members, cooperating each with a corresponding hydraulic driving device, comprising in combination
   a supporting device, a control lever disposed in said supporting device movable simultaneously in at least three different directions of motion, for each said direction of motion a continuously variable control device comprising a first part and an adustable part movable relative to said first part, said first part being connected to said supporting device,
   connecting means interconnecting said adjustable part and said control lever and adapted to move said adjustable part relative to said first part by a movement of said control lever in the corresponding one of said directions of motion only,
   each said control device being adapted to control one each of said hydraulic driving devices,
   for each said control device a retroactive device operatively connected to the corresponding one of said hydraulic driving devices and adapted to cooperate with said control device and for ensuring that each position of said adjustable part of said control device corresponds to a certain position of the last said driving device.

2. A control unit as defined in claim 1, said control lever disposed in said supporting device being simultaneously pivotable forward and backward, and from side to side, and axially displaceable.

3. A control unit as defined in claim 1, said control lever disposed in said supporting device being simultaneously rotatable and pivotable forward and backward, and from side to side.

4. A control unit as defined in claim 1, said control lever disposed in said supporting device being simultaneously rotatable, axially displaceable and pivotable forward and backward, and from side to side.

5. A control unit as defined in claim 1, an auxiliary rod connected to said control lever movable relative thereto, a rod operated control device comprising a first part and an adjustable part movable relative to said first part of said rod operated control device, said first part of said rod operated control device being attached to said control lever, rod connecting means interconnecting said auxiliary rod and said adjustable part of said rod operated control device for moving the same relative to said first part of said rod operated control device by movement of said auxiliary rod relative to said control lever.

6. A control unit as defined in claim 5, said auxiliary rod being axially displaceable relative to said control lever.

7. A control unit for an hydraulic system provided with at least three hydraulically operated members each controlled by a corresponding hydraulic driving device, comprising in combination,
   a supporting device, a supporting member universally pivotably arranged in said supporting member, a control lever disposed in said supporting member movable in at least one direction of motion relative to said supporting member,
   a first, a second and a third control device each comprising a first part and an adjustable part movable relative to said first part,
   said first and said second control devices having their said first parts arranged in said supporting device independent of said supporting member,
   first connecting means interconnecting said control lever and said adjustable part of said first control device and adapted to move the same relative to said first part of said first control device by a swinging of said control lever in a first direction of swinging only,
   second connecting means interconnecting said control lever and said adjustable part of said second control device and adapted to move the same relative to said first part of said second control device by a swinging of said control lever in a second direction of swinging only, said second direction of swinging being another than said first direction of swinging,
   said first part of said third control member being connected to said supporting member, third connecting means interconnecting said control lever and said adjustable part of said third control device and adapted to move said last named adjustable part relative to said first part by a movement of said control lever relative to said supporting member, each said control device being adapted to control one each of said hydraulic driving devices, for each said control device a retroactive device operatively connected to the corresponding one of said hydraulic driving devices and adapted to cooperate with said last named control device for ensuring that each position of said adjustable part of the corresponding control device corresponds to a certain position of the last said driving device.

8. A control unit as defined in claim 7, said control lever being axially displaceably mounted in said supporting member.

9. A control unit as defined in claim 7, said control lever being rotatably mounted in said supporting member.

10. A control unit as defined in claim 7, said control lever being hollow, an auxiliary rod being mounted axially displaceable within said control lever, handle means for displacing said auxiliary rod relative to said control lever, a rod control device comprising a first part and an adjustable part movable relative to said first part, said first part being connected to said control lever, rod connecting means interconnecting said auxiliary rod and said last named adjustable part and adapted to move the same relative to said first part by an axial displacement of said auxiliary rod relative to said control lever.

11. A control unit as defined in claim 1, at least one of said hydraulic driving devices comprising an electrically controlled valve device, one of said three control devices being adapted to control said electrically controlled valved device, said one control device being an adjustable first potentiometer provided with a first potentiometer coil member and a first sliding contact member slidable along said first potentiometer coil member, one of said two potentiometer members constituting the said first part of said one control device, the other one of said two potentiometer members constituting said movable part of said one control device, the said retroactive device corresponding to said one control device being an answering second potentiometer comprising a second potentiometer coil member and a second sliding contact member slidable along said second potentiometer coil member, operating means operatively interconnecting one of said two answering potentiometer members to a movable part of said hydraulic driving device, each said potentiometer coil member having a first end and a second end, each position of said first sliding contact member defined by its distance from said first end of said first potentiometer coil member corresponding to a position of said second contact member at a distance from said first end of said second potentiometer coil member directly proportional to said first distance, a differential relay comprising a first and a second relay coil and a relay armature, said differential relay being adapted to control said electrically controlled valve device for providing, when said relay armature is actuated by said first relay coil, a movement of said hydraulic driving device in a direction corresponding to a movement of said second contact member in a direction towards said second end of said second potentiometer coil member, and, when said armature is operated by said second relay coil, a movement of said driving device in the opposite direction, said first relay coil being inserted in a first relay coil feeding circuit, said second relay coil being inserted in a second relay coil feeding circuit, a first lead electrically interconnecting said first end of said first potentiometer coil member and said second end of said second potentiometer coil member, said second relay coil feeding circuit being inserted in said first lead, a second lead electrically interconnecting said second end of said first potentiometer coil member and said first end of said second potentiometer coil member, said first relay coil feeding circuit being inserted in said second lead, said two sliding contact members being connected to one pole each of a voltage source.

References Cited
UNITED STATES PATENTS 2,005,530   6/1935   Boykow          91—414 X
2,664,708   1/1959   Norelius et al.    91—414 X EDGAR W. GEOGHEGAN, *Primary Examiner.*